(12) United States Patent
Okubo et al.

(10) Patent No.: US 10,274,045 B2
(45) Date of Patent: Apr. 30, 2019

(54) V-RIBBED BELT

(71) Applicant: BANDO CHEMICAL INDUSTRIES, LTD., Kobe-shi (JP)

(72) Inventors: Takayuki Okubo, Kobe (JP); Kouichirou Hara, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 0 days.

(21) Appl. No.: 15/997,291

(22) Filed: Jun. 4, 2018

(65) Prior Publication Data

US 2018/0283495 A1 Oct. 4, 2018

Related U.S. Application Data

(63) Continuation of application No. PCT/JP2016/004452, filed on Oct. 3, 2016.

(30) Foreign Application Priority Data

Dec. 4, 2015 (JP) ................. 2015-237592

(51) Int. Cl.
*F16G 5/20* (2006.01)
*F16G 5/08* (2006.01)
*B32B 3/28* (2006.01)
*B32B 25/14* (2006.01)

(52) U.S. Cl.
CPC .................. *F16G 5/20* (2013.01); *B32B 3/28* (2013.01); *B32B 25/14* (2013.01); *F16G 5/08* (2013.01); *B32B 2262/0276* (2013.01); *B32B 2433/04* (2013.01)

(58) Field of Classification Search
CPC ..... F16G 1/28; F16G 1/10; F16G 1/06; F16G 1/08; F16G 5/06; F16G 5/20; F16G 5/00; F16G 5/04; B32B 3/28; B32B 2262/0276; B32B 2433/04
See application file for complete search history.

(56) References Cited

U.S. PATENT DOCUMENTS

2012/0058849 A1 3/2012 Yoshida
2012/0295748 A1* 11/2012 Shiriike .................... F16G 5/06
474/148

FOREIGN PATENT DOCUMENTS

| JP | 2006-300149 A | 11/2006 |
| JP | 2010-169215 A | 8/2010 |
| JP | 2010-242825 A | 10/2010 |
| WO | 2010/047029 A1 | 4/2010 |
| WO | 2010/134289 A1 | 11/2010 |
| WO | 2011/074182 A1 | 6/2011 |

* cited by examiner

*Primary Examiner* — Christopher M Rodd
(74) *Attorney, Agent, or Firm* — Knobbe, Martens, Olson & Bear, LLP

(57) ABSTRACT

A compressed rubber layer of a V-ribbed belt includes a surface rubber layer including side surface portions of V-shaped ribs, and an inner rubber portion provided inside the surface rubber layer. The surface rubber layer and the inner rubber portion are each made of a rubber composition containing an ethylene-α-olefin elastomer as a main ingredient of a rubber component. An ethylene content of the ethylene-α-olefin elastomer contained in the rubber component of the rubber composition forming the surface rubber layer is higher than an ethylene content of the ethylene-α-olefin elastomer contained in the rubber component of the rubber composition forming the inner rubber portion.

15 Claims, 15 Drawing Sheets

V-RIBBED BELT

CROSS-REFERENCE TO RELATED APPLICATIONS

This is a continuation of International Application No. PCT/JP2016/004452 filed on Oct. 3, 2016, which claims priority to Japanese Patent Application No. 2015-237592 filed on Dec. 4, 2015. The entire disclosures of these applications are incorporated by reference herein.

BACKGROUND

It has been widely known that a rubber composition containing an ethylene-propylene-diene terpolymer (EPDM) as a rubber component forms a V-ribbed belt body of a V-ribbed belt. For example, Japanese Unexamined Patent Publication No. 2010-169215 discloses a V-ribbed belt including a compressed rubber layer and an adhesive rubber layer that are each made of a rubber composition containing an EPDM as a rubber component. The EPDM contained in the rubber composition for the compressed rubber layer has a different ethylene content from that of the EPDM contained in the rubber composition for the adhesive rubber layer. Japanese Unexamined Patent Publication No. 2006-300149 discloses a V-ribbed belt including a compressed rubber layer that is made of a rubber composition containing a blend of two EPDMs having different ethylene contents as a rubber component. International Publication No. WO 2010/134289 discloses a V-ribbed belt including a compressed rubber layer that includes a surface rubber layer and an inner rubber portion. The surface rubber layer and the inner rubber portion are both made of a rubber composition containing an EPDM having an ethylene content of 55% by mass as a rubber component.

SUMMARY

The present invention is directed to a V-ribbed belt comprising: a compressed rubber layer constituting an inner surface portion of the V-ribbed belt, the compressed rubber layer being provided with a plurality of V-shaped ribs extending in a belt longitudinal direction, the V-shaped ribs being arranged parallel to one another in a belt width direction. The compressed rubber layer includes a surface rubber layer including side surface portions of the V-shaped ribs, and an inner rubber portion provided inside the surface rubber layer, the surface rubber layer and the inner rubber portion are each made of a rubber composition containing an ethylene-α-olefin elastomer as a main ingredient of a rubber component, and an ethylene content of the ethylene-α-olefin elastomer contained in the rubber component of the rubber composition forming the surface rubber layer is higher than an ethylene content of the ethylene-α-olefin elastomer contained in the rubber component of the rubber composition forming the inner rubber portion.

DETAILED DESCRIPTION

Embodiments will be described in detail below.

First Embodiment

Figure 1:
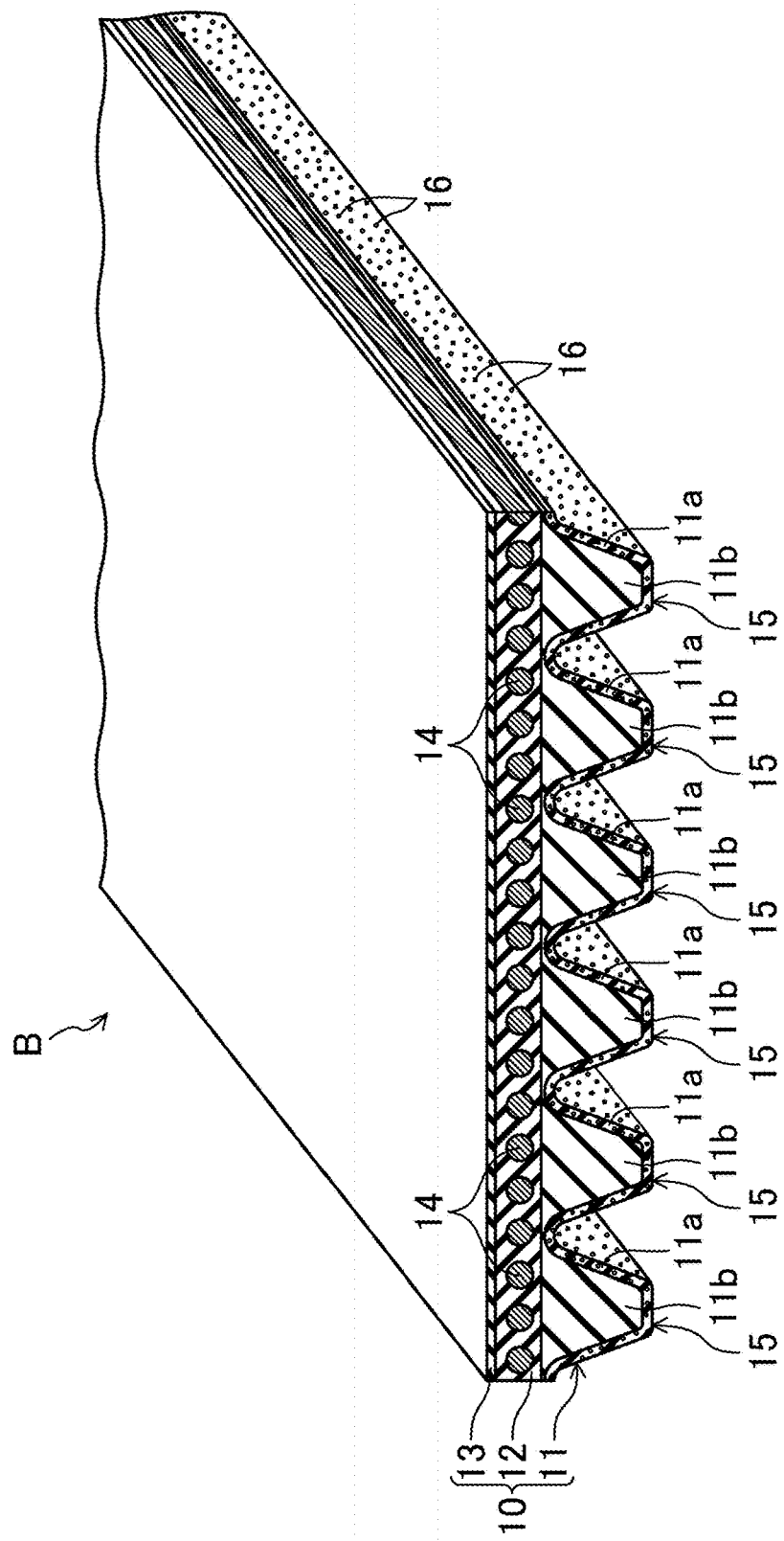
FIG. 1 illustrates a perspective view of a V-ribbed belt according to a first embodiment.
Figure 2:
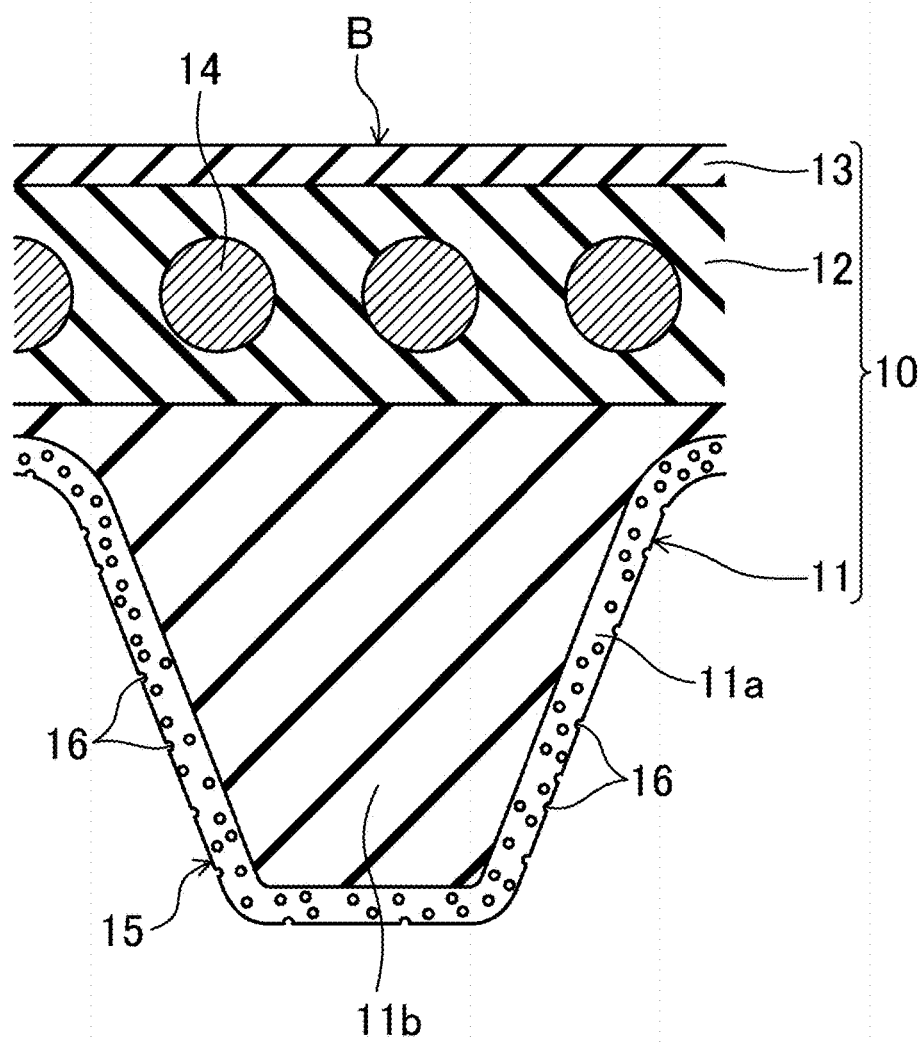
FIG. 2 illustrates a cross-sectional view of a single V-shaped rib of the V-ribbed belt according to the first embodiment.

FIGS. 1 and 2 illustrate a V-ribbed belt B of a first embodiment. The V-ribbed belt B of the first embodiment is used in, for example, a belt transmission system for driving an accessory provided in an engine compartment of an automobile. The V-ribbed belt B of the first embodiment has a length from 700 mm to 3000 mm, a width from 10 mm to 36 mm, and a thickness from 4 mm to 5 mm, for example.

The V-ribbed belt B of the first embodiment has a three-layered V-ribbed belt body 10 which includes a compressed rubber layer 11 constituting an inner surface portion of the belt, an adhesive rubber layer 12 constituting an intermediate portion of the belt, and a backface rubber layer 13 constituting an outer surface portion of the belt. A cord 14 is embedded in a middle portion, in the belt thickness direction, of the adhesive rubber layer 12 of the V-ribbed belt body 10, such that the cord 14 forms a helical pattern having a pitch in the belt width direction. The compressed rubber layer 11 has a thickness from 1.0 mm to 3.6 mm, for example. The adhesive rubber layer 12 has a thickness from 1.0 mm to 2.5 mm, for example. The backface rubber layer 13 has a thickness from 0.4 mm to 0.8 mm, for example.

The compressed rubber layer 11 includes a plurality of V-shaped ribs 15 protruding from the inner side of the belt. The plurality of V-shaped ribs 15 are each in the shape of a rib extending in the longitudinal direction of the belt and having an approximately inverted triangular cross-section. The V-shaped ribs 15 are arranged parallel to one another in the width direction of the belt. Each of the V-shaped ribs 15 has, for example, a height from 2 mm to 3 mm, and a width from 1.0 mm to 3.6 mm at a proximal end. The number of the V-shaped ribs is three or more and six or less (six ribs in FIG. 1), for example.

The compressed rubber layer 11 includes a surface rubber layer 11a and an inner rubber portion 11b. The surface rubber layer 11a is formed into a layer shape which extends along the entire surfaces of the V-shaped ribs 15, and is made of porous rubber. The inner rubber portion 11b is formed inside the surface rubber layer 11a, and is made of solid rubber. Thus, the surface rubber layer 11a includes all of side surface portions of the V-shaped ribs 15. The surface rubber layer 11a has a thickness from 50 µm to 500 µm, for example.

The term "porous rubber" herein means a crosslinked rubber composition having therein many hollow portions and having a surface with many recesses, and may have either a structure in which the hollow portions and the recesses are distributed or a structure in which the hollow portions and the recesses are connected together. The term "solid rubber" herein means a crosslinked rubber composition that is not made of "porous rubber" and has no hollow portions or no recesses.

The surface rubber layer 11a and the inner rubber portion 11b of the compressed rubber layer 11 are each made of a rubber composition produced by heating and pressing an uncrosslinked rubber composition prepared by kneading a rubber component blended with various ingredients, and crosslinking the kneaded product by a crosslinker.

The rubber component of the rubber composition forming each of the surface rubber layer 11a and the inner rubber portion 11b of the compressed rubber layer 11 contains an ethylene-α-olefin elastomer as the main ingredient. Examples of the ethylene-α-olefin elastomer include an ethylene-propylene-diene terpolymer (hereinafter referred to as "EPDM"), an ethylene-propylene copolymer (EPR), an ethylene-octene copolymer, and an ethylene-butene copolymer. The rubber component suitably contains one kind or two or more kinds of these substances, and more suitably contains an EPDM. The rubber component has an ethylene-α-olefin elastomer content of 50% by mass or more, suitably 80% by mass or more, more suitably 90% by mass or more, and still more suitably 100% by mass. The rubber component may contain, in addition to the ethylene-α-olefin elastomer, a chloroprene rubber (CR), a chlorosulfonated polyethylene rubber (CSM), and a hydrogenated acrylonitrile rubber (H-NBR), for example.

The ethylene-α-olefin elastomer contained in the rubber component of the rubber composition forming the surface rubber layer 11a has an ethylene content (A1) of suitably 59% by mass or more, more suitably from 62% by mass or more, and still more suitably 66% by mass or more, and suitably 85% by mass or less, more suitably 70% by mass or less, and still more suitably 68% by mass or less. The ethylene-α-olefin elastomer contained in the rubber component of the rubber composition forming the inner rubber portion 11b has an ethylene content (A2) of suitably 45% by mass or more, more suitably 50% by mass or more, and still more suitably 57% by mass or more, and suitably 66% by mass or less, more suitably 62% by mass or less, and still more suitably 59% by mass or less. Note that if the rubber component contains a plurality of ethylene-α-olefin elastomers, the ethylene content calculated is an average ethylene content.

The ethylene content (A1) of the ethylene-α-olefin elastomer contained in the rubber component of the rubber composition forming the surface rubber layer 11a is higher than the ethylene content (A2) of the ethylene-α-olefin elastomer contained in the rubber component of the rubber composition forming the inner rubber portion 11b. The ratio (A1/A2) of the ethylene content (A1) of the ethylene-α-olefin elastomer contained in the rubber component of the rubber composition forming the surface rubber layer 11a to the ethylene content (A2) of the ethylene-α-olefin elastomer contained in the rubber component of the rubber composition forming the inner rubber portion 11b is suitably 1.05 or more and more suitably 1.14 or more, and is suitably 1.90 or less and more suitably 1.16 or less.

If the rubber component of each of the rubber composition forming the surface rubber layer 11a and the rubber composition forming the inner rubber portion 11b contains an EPDM, examples of a diene component of the EPDM include ethylidene norbornene (ENB), dicyclopentadiene, and 1,4-hexadiene. Among these substances, ethylidene norbornene is suitable. The EPDM contained in the rubber component of the rubber composition forming the surface rubber layer 11a suitably contains the same diene component as the EPDM contained in the rubber component of the rubber composition forming the inner rubber portion 11b. The diene component is more suitably ethylidene norbornene.

If the rubber component of the rubber composition forming the surface rubber layer 11a contains an EPDM, which contains ethylidene norbornene as its diene component, the ethylidene norbornene content (ENB content) (B1) in the EPDM is suitably 0.50% by mass or more and more suitably 5.7% by mass or more, and is suitably 14% by mass or less and more suitably 5.9% by mass or less. If the rubber component of the rubber composition forming the inner rubber portion 11b contains an EPDM, which contains ethylidene norbornene as its diene component, the ENB content (B2) in the EPDM is suitably 0.50% by mass or more and more suitably 4.4% by mass or more, and is suitably 14% by mass or less and more suitably 4.6% by mass or less. Note that if the rubber component contains a plurality of EPDMs, the ENB content calculated is an average ENB content.

If the rubber component of each of the rubber composition forming the surface rubber layer 11a and the rubber composition forming the inner rubber portion 11b contains an EPDM, which contains ethylidene norbornene as its diene component, the ENB content (B1) of the EPDM contained in the rubber component of the rubber composition forming the surface rubber layer 11a is suitably higher than the ENB content (B2) of the EPDM contained in the rubber component of the rubber composition forming the inner rubber portion 11b. The ratio (B1/B2) of the ENB content (B1) of the EPDM contained in the rubber component of the rubber composition forming the surface rubber layer 11a to the ENB content (B2) of the EPDM contained in the rubber component of the rubber composition forming the inner rubber portion 11b is suitably 1.10 or more and more suitably 1.20 or more, and is suitably 1.40 or less and more suitably 1.30 or less.

The Mooney viscosity (C1) at 125° C. of the ethylene-α-olefin elastomer contained in the rubber component of the rubber composition forming the surface rubber layer 11a is suitably 15.0 $ML_{1+4}$ (125° C.) or more and more suitably 22.0 $ML_{1+4}$ (125° C.) or more, and is suitably 90.0 $ML_{1+4}$ (125° C.) or less and more suitably 24.0 $ML_{1+4}$ (125° C.) or less. The Mooney viscosity (C2) at 125° C. of the ethylene-α-olefin elastomer contained in the rubber component of the rubber composition forming the inner rubber portion 11b is suitably 15.0 $ML_{1+4}$ (125° C.) or more and more suitably 19.0 $ML_{1+4}$ (125° C.) or more, and is suitably 90.0 $ML_{1+4}$ (125° C.) or less and more suitably 20.0 $ML_{1+4}$ (125° C.) or less. The Mooney viscosity is measured based on JIS K6300.

The Mooney viscosity (C1) at 125° C. of the ethylene-α-olefin elastomer contained in the rubber component of the rubber composition forming the surface rubber layer 11a is suitably higher than the Mooney viscosity (C2) at 125° C. of the ethylene-α-olefin elastomer contained in the rubber component of the rubber composition forming the inner rubber portion 11b. The ratio (C1/C2) of the Mooney viscosity (C1) at 125° C. of the ethylene-α-olefin elastomer contained in the rubber component of the rubber composition forming the surface rubber layer 11a to the Mooney viscosity (C2) at 125° C. of the ethylene-α-olefin elastomer contained in the rubber component of the rubber composition forming the inner rubber portion 11b is suitably 1.10 or more and more suitably 1.15 or more, and is suitably 1.25 or less and more suitably 1.20 or less.

Examples of the ingredients include a reinforcing material such as carbon black, a softener, a processing aid, a vulcanization aid, a crosslinker, a vulcanization accelerator, and a resin for rubber blending.

Examples of carbon blacks used as the reinforcing material include: channel black; furnace black such as SAF, ISAF, N-339, HAF, N-351, MAF, FEF, SRF, GPF, ECF, and N-234; thermal black such as FT and MT; and acetylene black. Silica may also be used as the reinforcing material. Suitably, the reinforcing material is comprised of one kind or two or more kinds of these substances. The reinforcing material of the rubber composition forming the surface rubber layer 11a suitably includes both HAF and GPF. FEF alone is suitably used as the reinforcing material of the rubber composition forming the inner rubber portion 11b. The content of the reinforcing material with respect to 100 parts by mass of the rubber component is 30 parts by mass or more and 80 parts by mass or less, for example.

Examples of the softener include a petroleum softener, a mineral oil-based softener such as paraffin wax, and a vegetable oil-based softener such as castor oil, cottonseed oil, linseed oil, rapeseed oil, soybean oil, palm oil, coconut oil, peanut oil, Japan wax, rosin, and pine oil. Suitably, the softener is comprised of one kind or two or more kinds of these substances. The content of the softener with respect to 100 parts by mass of the rubber component is 2 parts by mass or more and 30 parts by mass or less, for example.

Examples of the processing aid include stearic acid. The processing aid may be comprised of either one kind or two or more kinds. The content of the processing aid with respect to 100 parts by mass of the rubber component is 0.5 parts by mass or more and 5 parts by mass or less, for example.

Examples of the vulcanization aid include metal oxides such as zinc oxide (zinc white) and magnesium oxide. Suitably, the vulcanization aid is comprised of one kind or two or more kinds of these substances. The content of the vulcanization aid with respect to 100 parts by mass of the rubber component is 1 part by mass or more and 10 parts by mass or less, for example.

Examples of the crosslinker include sulfur and an organic peroxide. Sulfur alone, an organic peroxide alone, or even a combination of these substances may be used as the crosslinker. The content of sulfur as the crosslinker with respect to 100 parts by mass of the rubber component is 0.50 parts by mass or more and 4.0 parts by mass or less, for example. The content of the organic peroxide as the crosslinker with respect to 100 parts by mass of the rubber component is 0.50 parts by mass or more and 8.0 parts by mass or less.

Examples of the vulcanization accelerator include a metal oxide, a metal carbonate, a fatty acid, and a derivative thereof. Suitably, the vulcanization accelerator is comprised of one kind or two or more kinds of these substances. The content of the vulcanization accelerator with respect to 100 parts by mass of the rubber component is 0.50 parts by mass or more and 8.0 parts by mass or less, for example.

Examples of the resin for rubber blending include a high-styrene resin, a phenol resin, and an ultrahigh molecular polyethylene resin. Suitably, the resin for rubber blending is comprised of one kind or two or more kinds of these substances. A high-styrene resin, a phenol resin, and an ultrahigh molecular polyethylene resin are suitably used in combination for the rubber composition forming the surface rubber layer 11a. A phenol resin alone is suitably used for the rubber composition forming the inner rubber portion 11b. The content of the resin for rubber blending with respect to 100 parts by mass of the rubber component is 3 parts by mass or more and 50 parts by mass or less, for example.

The surface rubber layer 11a is made of porous rubber, whereas the uncrosslinked rubber composition before being formed into the surface rubber layer 11a contains unexpanded hollow particles and/or a foaming agent for forming porous rubber. Examples of the unexpanded hollow particles include particles including a solvent encapsulated in a shell made of a thermoplastic polymer (e.g., an acrylonitrile polymer) or any other suitable material. The hollow particles may be comprised of either one kind or two or more kinds of these particles. The content of the hollow particles with respect to 100 parts by mass of the rubber component is suitably 0.50 parts by mass or more and more suitably 1.0 part by mass or more, and is suitably 10 parts by mass or less and more suitably 5.0 parts by mass or less. Examples of the foaming agent include organic foaming agents, such as an ADCA foaming agent mainly containing azodicarbonamide, a DPT foaming agent mainly containing dinitrosopentamethylenetetramine, an OBSH foaming agent mainly containing p,p'-oxybisbenzenesulfonylhydrazide, and an HDCA foaming agent mainly containing hydrazodicarbonamide. Suitably, the foaming agent is comprised of one kind or two or more kinds of these substances. The content of the foaming agent with respect to 100 parts by mass of the rubber component is suitably 0.50 parts by mass or more and more suitably 4.0 part by mass or more, and is suitably 10 parts by mass or less and more suitably 7.0 parts by mass or less.

The surface rubber layer 11a, which is made of porous rubber, has a surface with many recesses 16. The recesses 16 have an average diameter of suitably 40 μm or more and more suitably 80 μm or more, and suitably 150 μm or less and more suitably 120 μm or less. The average diameter of the recesses 16 is determined by the number-average diameter of 50 or more and 100 or less recesses measured with a surface image.

The rubber composition forming the surface rubber layer 11a may contain short fibers. In this case, the short fibers are suitably oriented in the belt width direction. The short fibers exposed at a surface of the surface rubber layer 11a suitably include short fibers protruding from the surface. Examples of such short fibers include nylon short fibers, aramid short fibers, polyester short fibers, and cotton dust. It is suitable to use one kind or two or more kinds of these fibers as the short fibers. The short fibers are suitably subjected to an adhesion treatment in which the short fibers are soaked, for example, in an aqueous solution of resorcin/formalin/latex (hereinafter referred to as "RFL aqueous solution") and thereafter heated. The short fibers have a length from 0.2 mm to 3.0 mm, for example. The content of the short fibers with respect to 100 parts by mass of the rubber component is 3.00 parts by mass or more and 30.0 parts by mass or less, for example.

The abrasion loss of the rubber composition forming the surface rubber layer 11a, which is measured by a DIN abrasion test based on JIS K6264-2, is suitably 130 mm$^3$ or less and more suitably 115 mm$^3$ or less. The abrasion loss of the rubber composition forming the surface rubber layer 11a is suitably less than that of the rubber composition forming the inner rubber portion 11b. The difference between these abrasion losses is suitably 15.0 mm$^3$ or more and more suitably 50.0 mm$^3$ or more.

The brittle temperature of the rubber composition forming the inner rubber portion 11b which is measured based on JIS K6261, is suitably −50° C. or lower and more suitably −60° C. or lower. The brittle temperature of the rubber composition forming the inner rubber portion 11b is suitably lower than that of the rubber composition forming the surface rubber layer 11a. The difference between these brittle temperatures is suitably 5.0° C. or more and more suitably 10° C. or more.

The adhesive rubber layer 12 is in the shape of a strip having a horizontally elongated rectangular cross-section, and has a thickness from 1.0 mm to 2.5 mm, for example. The backface rubber layer 13 is in the shape of a strip having a horizontally elongated rectangular cross-section, and has a thickness from 0.4 mm to 0.8 mm, for example. Suitably, a surface of the backface rubber layer 13 has a weave pattern transferred from woven fabric in order to reduce sounds generated between the backface rubber layer 13 and a flat pulley in contact with the backface rubber layer 13.

The adhesive rubber layer 12 and the backface rubber layer 13 are each suitably made of a rubber composition produced by heating and pressing an uncrosslinked rubber composition prepared by kneading a rubber component blended with various ingredients, and crosslinking the kneaded product by a crosslinker. In order to reduce sticking between the backface rubber layer 13 and the flat pulley in contact with the backface rubber layer 13, the backface rubber layer 13 is suitably made of a rubber composition which is slightly harder than the rubber composition of the adhesive rubber layer 12.

Examples of the rubber component of the rubber composition forming the adhesive rubber layer 12 and the backface rubber layer 13 include an ethylene-α-olefin elastomer, a chloroprene rubber (CR), a chlorosulfonated polyethylene rubber (CSM), and a hydrogenated acrylonitrile-butadiene rubber (H-NBR). The rubber component is suitably an ethylene-α-olefin elastomer just like the surface rubber layer 11a and the inner rubber portion 11b of the compressed rubber layer 11. Suitably, the rubber component of each of the adhesive rubber layer 12 and the backface rubber layer 13 is the same as the rubber component of the inner rubber portion 11b of the compressed rubber layer 11.

Examples of the ingredients include a reinforcing material such as carbon black, a softener, a processing aid, a vulcanization aid, a crosslinker, a vulcanization accelerator, and a resin for rubber blending, just like the compressed rubber layer 11.

The rubber compositions that make the inner rubber portion 11b of the compressed rubber layer 11, the adhesive rubber layer 12, and the backface rubber layer 13 may be different from each other or the same as each other.

The cord 14 is made of twist yarn of fibers, such as polyester fibers (PET), polyethylene naphthalate fibers (PEN), aramid fibers, and vinylon fibers. The diameter of the cord 14 is, for example, 0.5 mm to 2.5 mm. The distance between the centers of the cord 14 which are adjacent to each other in a cross-section is 0.05 mm to 0.20 mm, for example. The cord 14 undergoes, prior to the molding of the belt, an adhesion treatment in which the cord 14 is soaked in an RFL aqueous solution and then heated and/or an adhesion treatment in which the cord 14 is soaked in rubber cement and then dried, to provide adhesiveness to the adhesive rubber layer 12 of the V-ribbed belt body 10.

In the V-ribbed belt B thus configured according to the first embodiment, the ethylene content (A1) of the ethylene-α-olefin elastomer contained in the rubber component of the rubber composition forming the surface rubber layer 11a including the side surface portions of the V-shaped ribs 15 is higher than the ethylene content (A2) of the ethylene-α-olefin elastomer contained in the rubber component of the rubber composition forming the inner rubber portion 11b. This allows the side surface portions of the V-shaped ribs 15 in contact with the pulleys to have high wear resistance, and allows the entire V-ribbed belt to have high cold resistance. In addition, although the rubber composition forming the surface rubber layer 11a is made of porous rubber, and is expected to have low wear resistance, not only high wear resistance but also high cold resistance can be achieved.

Now, a method for fabricating the V-ribbed belt B according to the first embodiment will be described.

Figure 3:
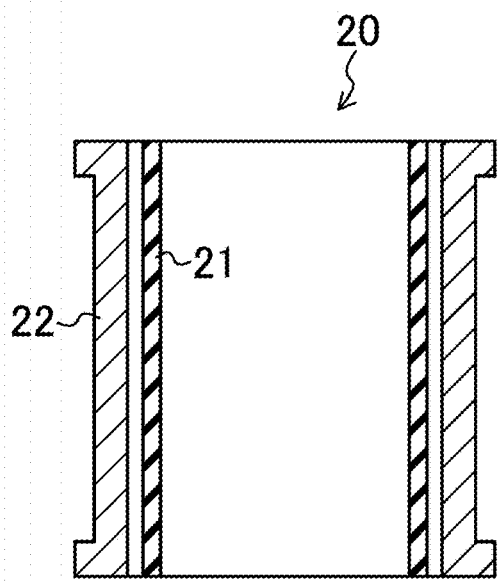
FIG. 3 illustrates a longitudinal cross-sectional view of a belt forming mold.
Figure 4:
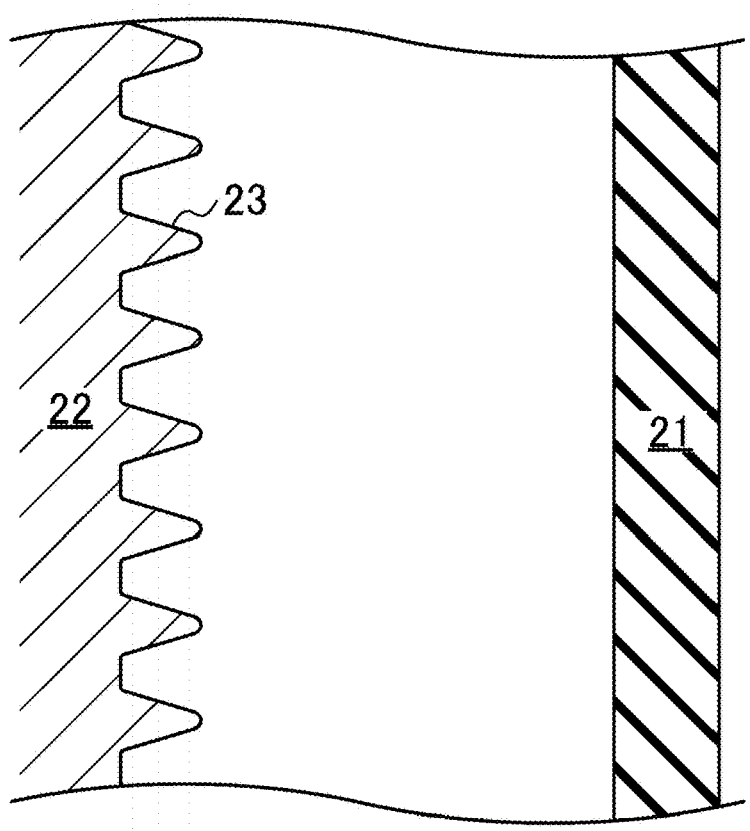
FIG. 4 illustrates an enlarged longitudinal cross-sectional view of a portion of the belt forming mold.

In fabricating the V-ribbed belt B of the first embodiment, a belt forming mold 20 comprised of a cylindrical inner mold 21 and a cylindrical outer mold 22 which are concentric with each other as shown in FIGS. 3 and 4, is used.

The inner mold 21 of the belt forming mold 20 is made of a flexible material, such as rubber. The outer mold 22 is made of a rigid material, such as metal. The inner circumferential surface of the outer mold 22 serves as a molding surface, and has V-shaped rib formation grooves 23 arranged at regular pitches in an axial direction. The outer mold 22 is provided with a temperature control mechanism which allows a heating medium, such as water vapor, or a cooling medium, such as water, to flow and control temperature. The belt forming mold 20 is provided with a pressurizing means configured to pressurize and expand the inner mold 21 from inside.

In the fabrication of the V-ribbed belt B of the first embodiment, compound ingredients are added to a rubber component, and the mixture is kneaded by a mixer, such as a kneader and a Banbury mixer. The resultant uncrosslinked rubber composition is shaped into a sheet by calendering, for example, to form uncrosslinked rubber sheets 11a' and 11b' for making a surface rubber layer 11a and an inner rubber portion 11b of a compressed rubber layer 11. Hollow particles and/or a foaming agent are/is added to the uncrosslinked rubber sheet 11a' for making the surface rubber layer 11a. Uncrosslinked rubber sheets 12' and 13' for making the adhesive rubber layer 12 and the backface rubber layer 13 are formed in a similar manner. After adhesion treatment in which twist yarn 14' to be the cord 14 is soaked in an RFL aqueous solution and heated, adhesion treatment in which the twist yarn 14' is soaked in rubber cement and is heated and dried, is performed.

Figure 5:
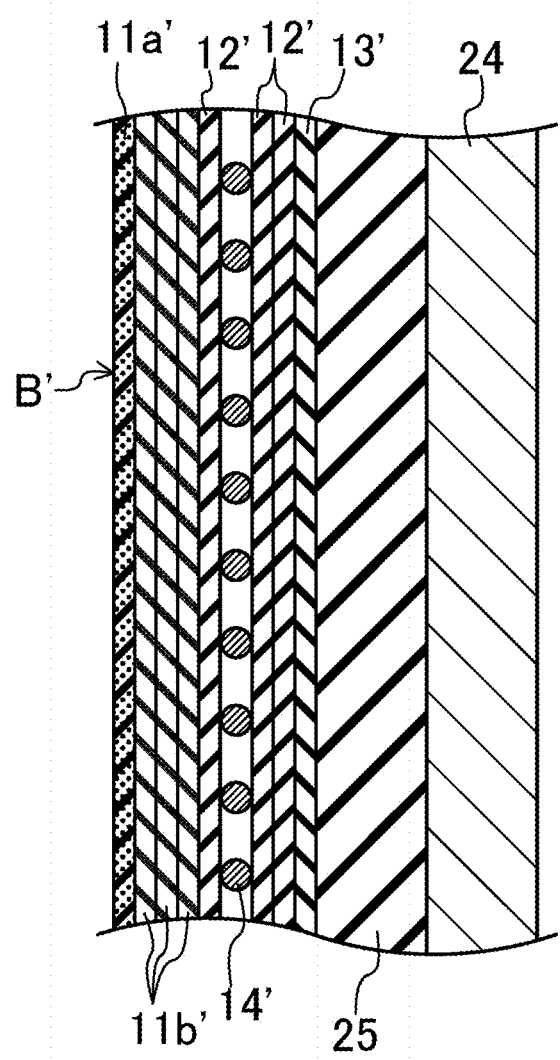
FIG. 5 is a first drawing for explaining a method for forming the V-ribbed belt according to the first embodiment.

Next, as shown in FIG. 5, a rubber sleeve 25 is placed on a cylindrical drum 24 having a smooth surface so as to cover the cylindrical drum 24. Then, the uncrosslinked rubber sheet 13' for the backside rubber layer 13 and the uncrosslinked rubber sheet 12' for the adhesive rubber layer 12 are sequentially wrapped around and layered on the cylindrical drum 24. After that, the twist yarn 14' for the cord 14 is helically wrapped around the cylindrical inner mold 21 to extend on the wrapped uncrosslinked rubber sheet 12', and another uncrosslinked rubber sheet 12' for the adhesive rubber layer 12, the uncrosslinked rubber sheet 11b' for the inner rubber portion 11b of the compressed rubber layer 11, and the uncrosslinked rubber sheet 11a' for the surface rubber layer 11a of the compressed rubber layer 11 are sequentially wrapped around and layered on the wrapped twist yarn 14', thereby forming a layered body B'.

Figure 6:
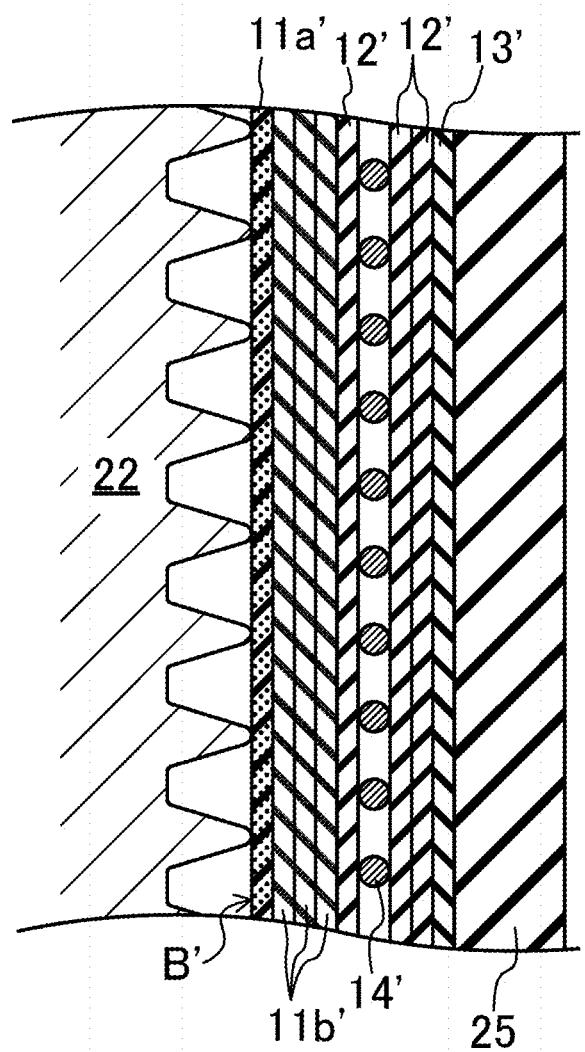
FIG. 6 is a second drawing for explaining the method for forming the V-ribbed belt according to the first embodiment.

Next, the rubber sleeve 25 having the layered body B' is removed from the cylindrical drum 24, and is then fitted to the inner circumferential surface of the outer mold 22 as shown in FIG. 6.

Figure 7:
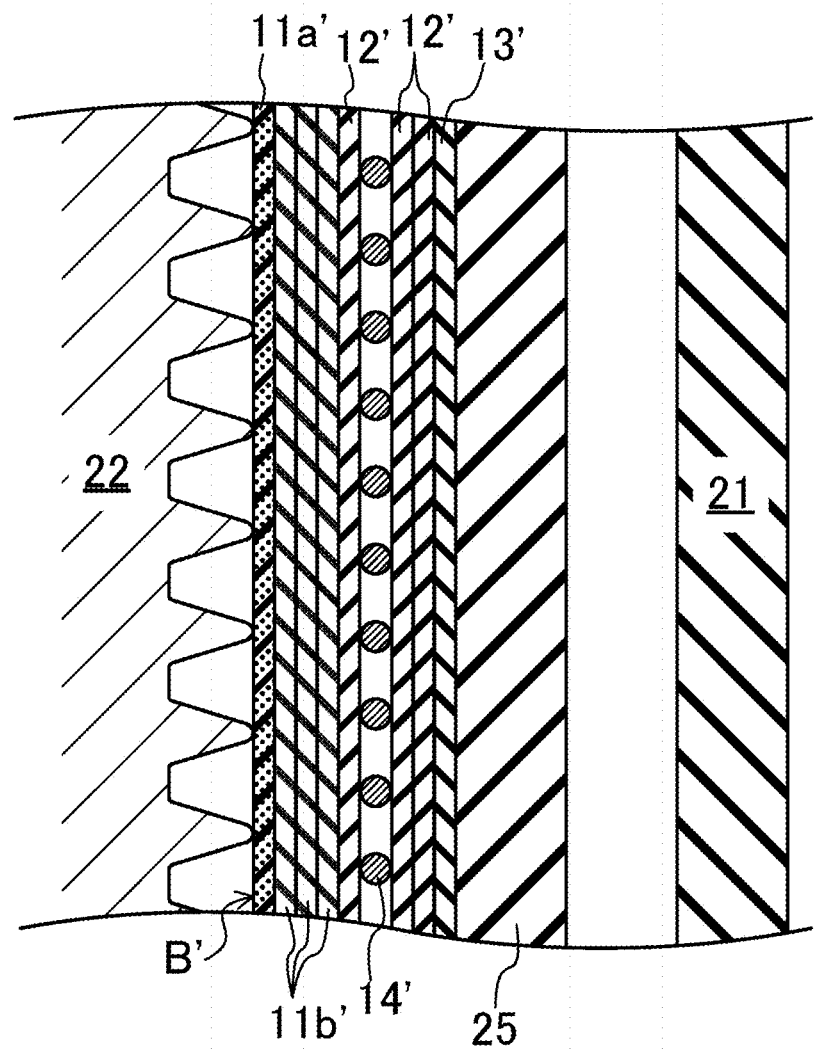
FIG. 7 is a third drawing for explaining the method for forming the V-ribbed belt according to the first embodiment.

Next, as shown in FIG. 7, the inner mold 21 is positioned inside the rubber sleeve 25 set in the outer mold 22, and hermetically sealed.

Figure 8:
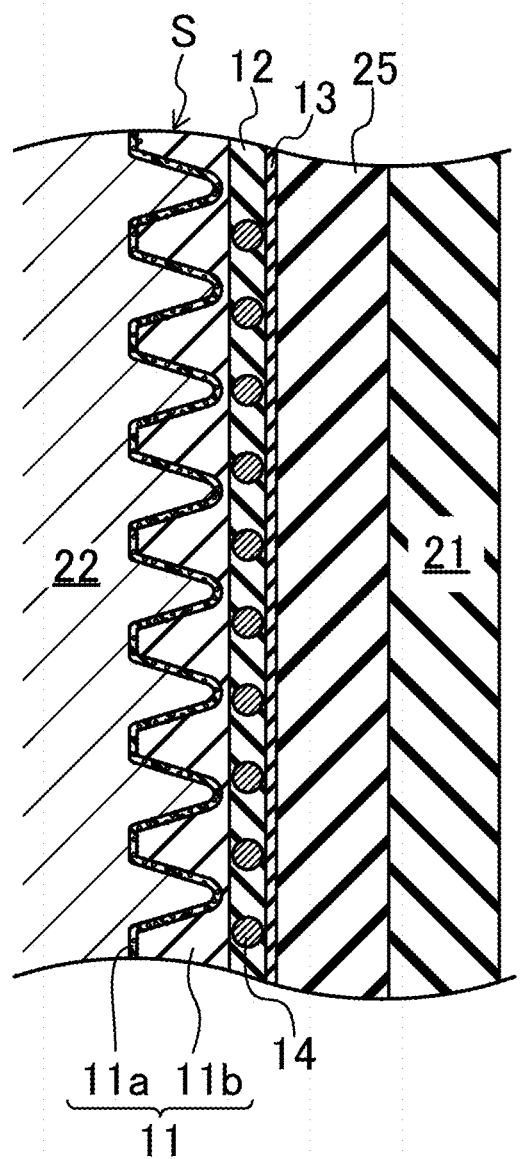
FIG. 8 is a fourth drawing for explaining the method for forming the V-ribbed belt according to the first embodiment.

Subsequently, the outer mold 22 is heated and the inner mold 21 is pressurized by introducing, for example, high-pressure air into its hermetically-sealed inner space. In this step, the inner mold 21 expands, and the belt formation uncrosslinked rubber sheets 11a', 11b', 12', 13' of the layered body B' are compressed on the molding surface of the outer mold 22, as shown in FIG. 8. At the same time, cross-linking is promoted in the sheets, and the sheets are integrated and combined with the twisted yarn 14'. Moreover, hollow particles 17 or a foaming agent in the uncrosslinked rubber sheet 11a' cause(s) a portion of the layered body B' corresponding to the surface rubber layer 11a to have many hollow portions. Lastly, a cylindrical belt slab S is formed. The molding temperature of the belt slab S is, for example, 100° C. to 180° C. The molding pressure is, for example, 0.5 MPa to 2.0 MPa. The molding time is, for example, 10 minutes to 60 minutes.

Next, the pressure of the inner space of the inner mold 21 is reduced to remove the sealing, and the belt slab formed between the inner mold 21 and the outer mold 22 via the rubber sleeve 25 is removed. The belt slab is cut into rings having a predetermined width, and turned inside out, thereby obtaining the V-ribbed belt B. If necessary, an outer surface of the belt slab S, i.e., a surface thereof having the V-shaped ribs 15, may be polished.

Figure 9:
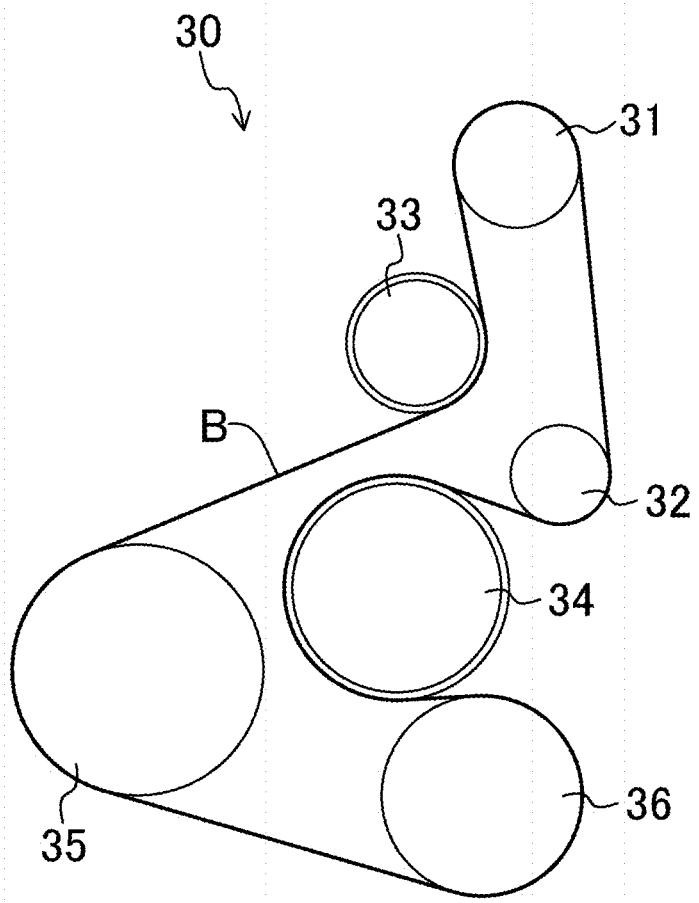
FIG. 9 illustrates a layout of pulleys of an accessory drive belt transmission system of an automobile.

FIG. 9 illustrates a layout of pulleys of an accessory drive belt transmission system 30 of an automobile using the V-ribbed belt B according to the first embodiment. The accessory drive belt transmission system 30 is a serpentine drive system in which the V-ribbed belt B is wrapped around six pulleys including four ribbed pulleys and two flat pulleys to transmit power.

The accessory drive belt transmission system 30 includes a power steering pulley 31, which is a ribbed pulley, at an uppermost position, and an AC generator pulley 32, which is a ribbed pulley, located below the power steering pulley 31. The system 30 also includes a tensioner pulley 33, which is a flat pulley, located at a lower left position of the power steering pulley 31, and a water pump pulley 34, which is a flat pulley, located below the tensioner pulley 33. The system 30 further includes a crank shaft pulley 35, which is a ribbed pulley, located at a lower left position of the tensioner pulley 33, and an air conditioning pulley 36, which is a ribbed pulley, located at a lower right position of the crank shaft pulley 35. These pulleys are made, for example, of pressed metals or castings, or resin moldings using, e.g., nylon resin and phenol resin, with a pulley diameter ranging from φ50 mm to φ150 mm.

In the accessory drive belt transmission system 30, the V-ribbed belt B is wrapped around the power steering pulley 31 with the V-shaped ribs 15 brought into contact with the power steering pulley 31, and then around the tensioner pulley 33 with the backface of the belt B brought into contact with the tensioner pulley 33. After that, the belt B is sequentially wrapped around the crank shaft pulley 35 and the air conditioning pulley 36 with the V-shaped ribs 15 brought into contact with the crank shaft pulley 35 and the air conditioning pulley 36, and further around the water pump pulley 34 with the backface of the belt B brought into contact with the water pump pulley 34. The belt B is then wrapped around the AC generator pulley 32 with the V-shaped ribs 15 brought into contact with the AC generator pulley 32, and returns to the power steering pulley 31 in the end. The belt span length, which is a length of the V-ribbed belt B between the pulleys, ranges from 50 mm to 300 mm, for example. The degree of misalignment allowable between the pulleys ranges from 0° to 2°.

Second Embodiment

Figure 10:
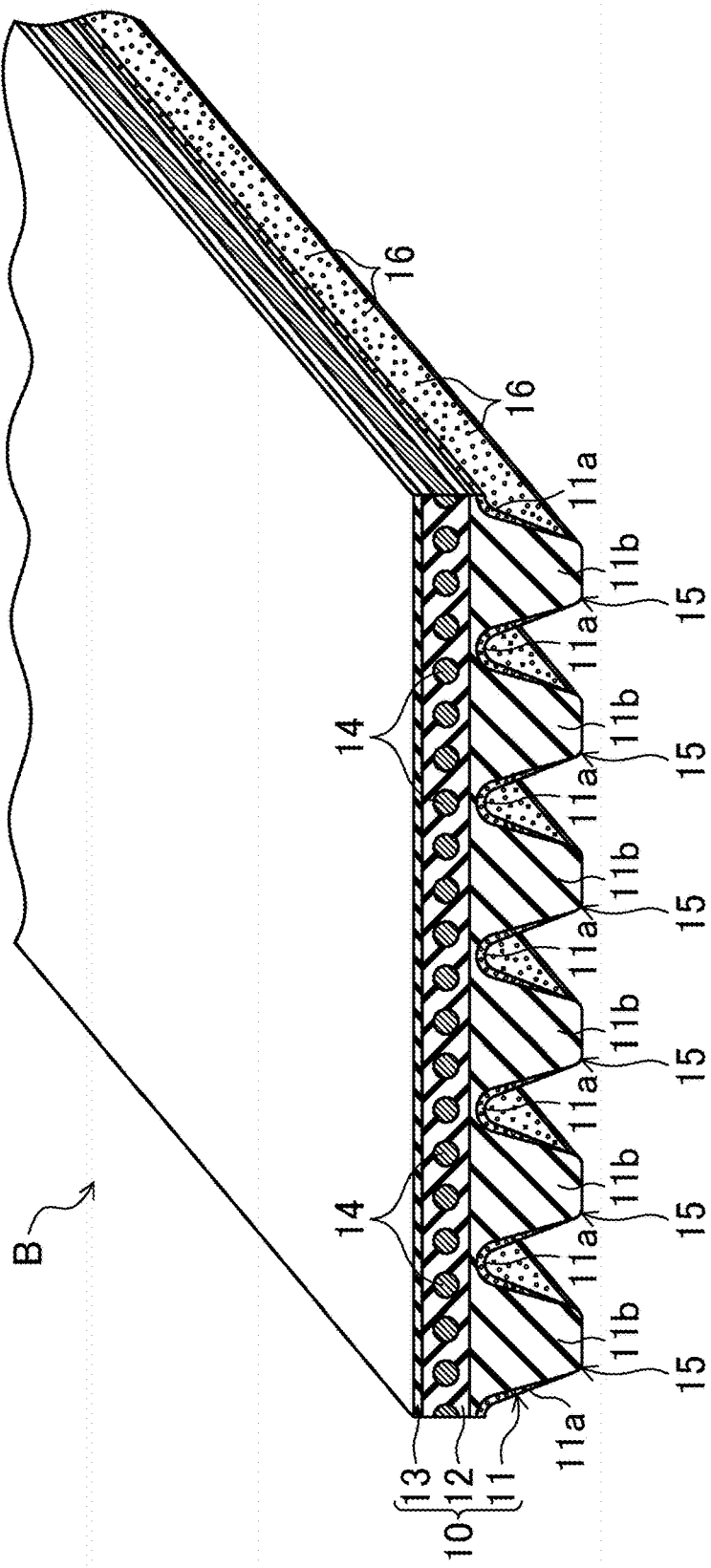
FIG. 10 illustrates a perspective view of a V-ribbed belt according to a second embodiment.
Figure 11:
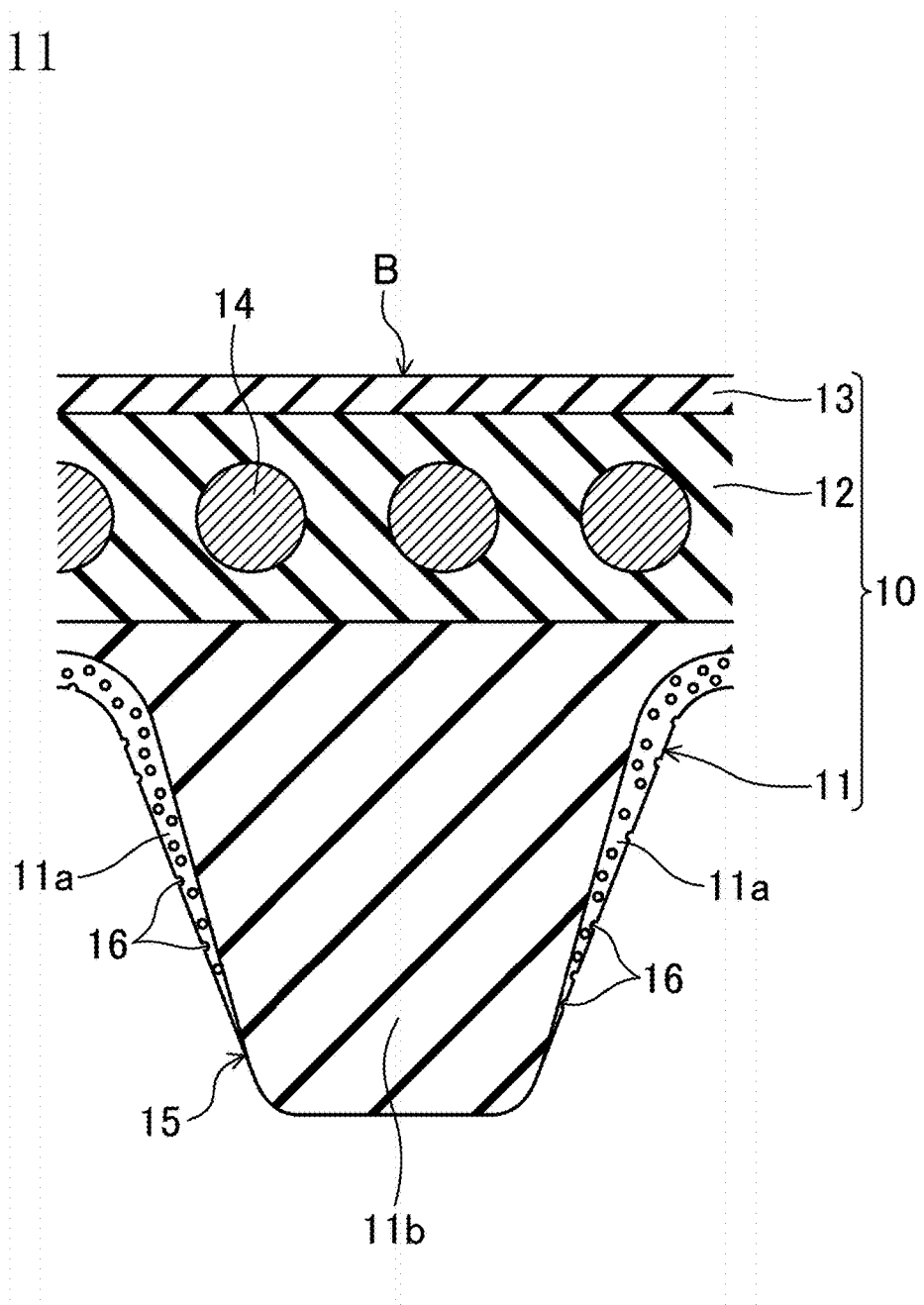
FIG. 11 illustrates a cross-sectional view of a single V-shaped rib of the V-ribbed belt according to the second embodiment.

FIGS. 10 and 11 illustrate a V-ribbed belt B of a second embodiment. Like reference characters have been used to designate the same elements as those in the first embodiment.

The V-ribbed belt B of the second embodiment includes a compressed rubber layer 11 including surface rubber layers 11a made of porous rubber. Two of the surface rubber layers 11a respectively extend along outer side surface portions of the outermost ones of V-shaped ribs 15. The other surface rubber layers 11a each extend along opposed side surface portions of a pair of the V-shaped ribs 15 adjacent to each other and a bottom portion between the ribs, which connects these opposed side surface portions together. The latter surface rubber layers 11a have an inverted U-shaped cross-section. Thus, each surface rubber layer 11a includes the outer side surface portions of the outermost V-shaped ribs or the opposed side surface portions of the pair of the V-shaped rib 15 adjacent to each other. The surface rubber layer 11a has a thickness from 50 µm to 500 µm, for example. Meanwhile, the inner rubber portion 11b made of solid rubber is provided inside the surface rubber layer 11a.

Figure 12:
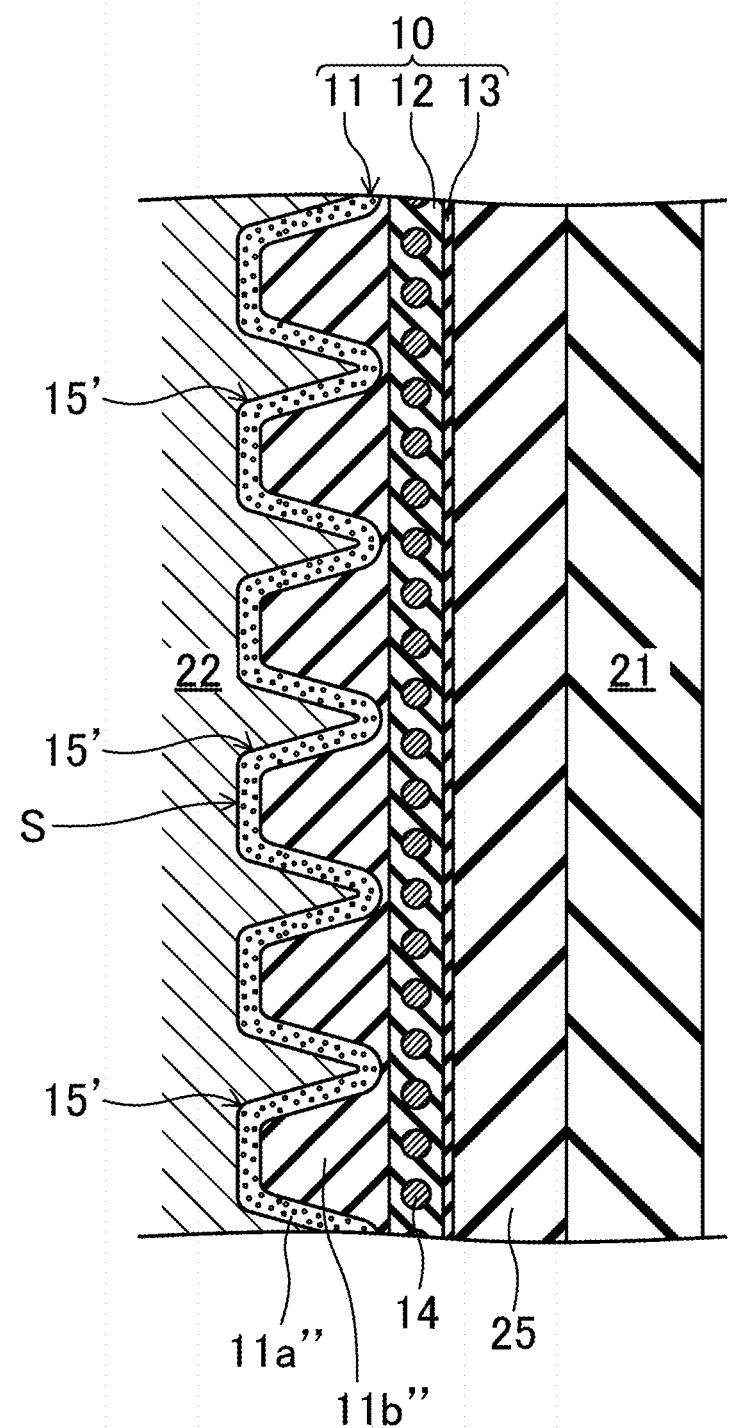
FIG. 12 is a first drawing for explaining a method for forming the V-ribbed belt according to the second embodiment.
Figure 13:
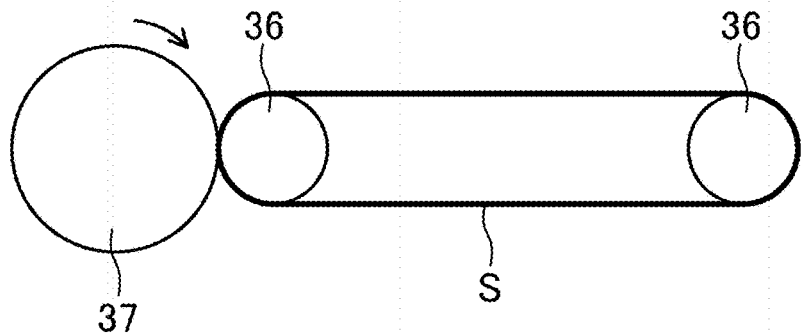
FIG. 13 is a second drawing for explaining the method for forming the V-ribbed belt according to the second embodiment.
Figure 14:
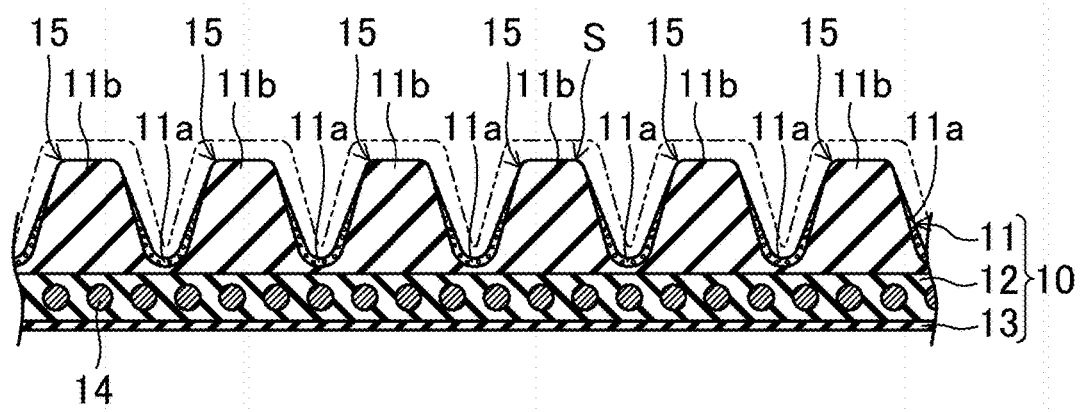
FIG. 14 is a third drawing for explaining the method for forming the V-ribbed belt according to the second embodiment.

To fabricate the V-ribbed belt B of the second embodiment, a cylindrical belt slab S shown in FIG. 12 is formed by a process similar to that in the first embodiment. This belt slab S has an outer surface having protrusions 15' that extend circumferentially and have a substantially trapezoidal cross-section. The protrusions 15' are sequentially arranged in an axial direction, and have a surface layer made of porous rubber 11a" and the other inner portion made of solid rubber 11b". Next, as shown in FIG. 13, the belt slab S is looped over a pair of slab holding shafts 36. A grinding stone 37, which has V-shaped rib formation grooves extending in a circumferential direction of the grinding stone 37 and sequentially arranged on the outer circumferential surface along an axial direction of the grinding stone 37, is rotated and brought into contact with the outer circumferential surface of the belt slab S, and the belt slab S is also rotated on the pair of slab holding shafts 36. As a result, as shown in FIG. 14, grinding the protrusions on the outer surface of the belt slab S provides a plurality of V-shaped ribs 15, which each include a surface rubber layer 11a of porous rubber and an inner rubber portion 11b of solid rubber.

The other features and advantages including the compositions of the surface rubber layer 11a and the inner rubber portion 11b are the same as those of the first embodiment.

Other Embodiments

Figure 15A:
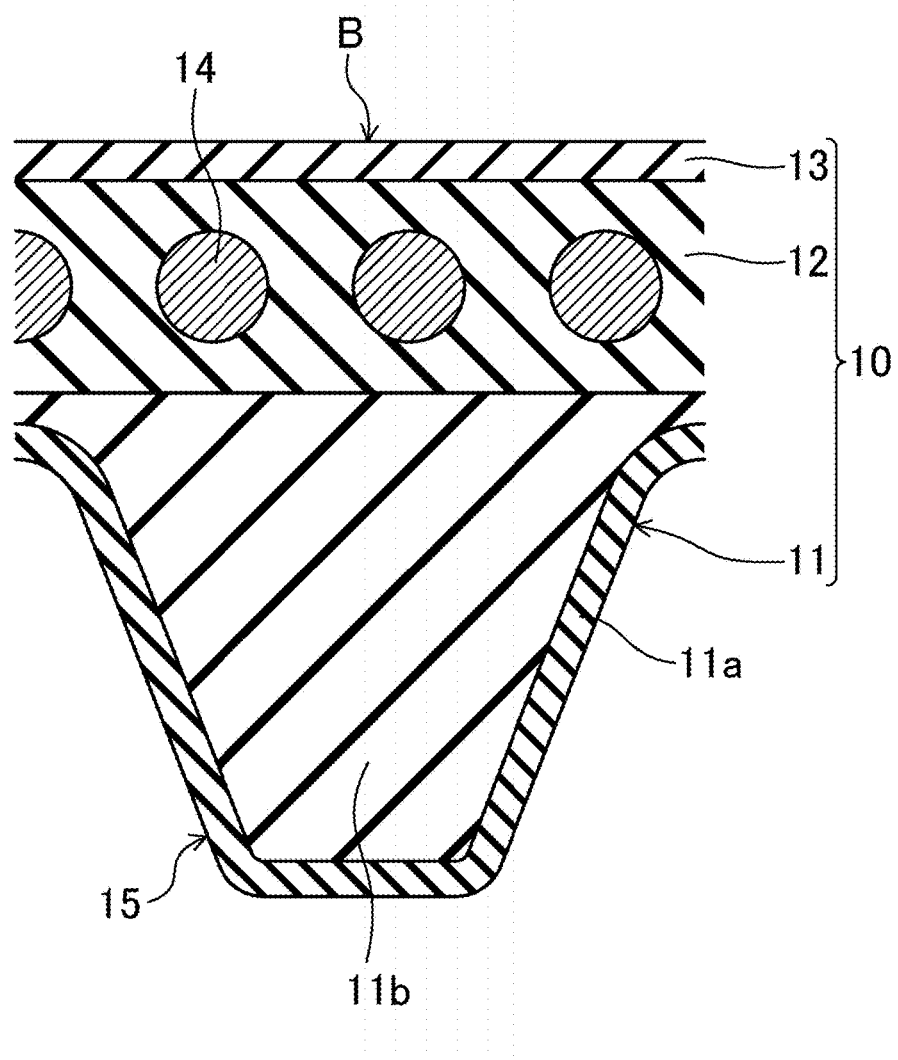
FIG. 15A illustrates a cross-sectional view of a single V-shaped rib of a V-ribbed belt according to a variation of the first embodiment.
Figure 15B:
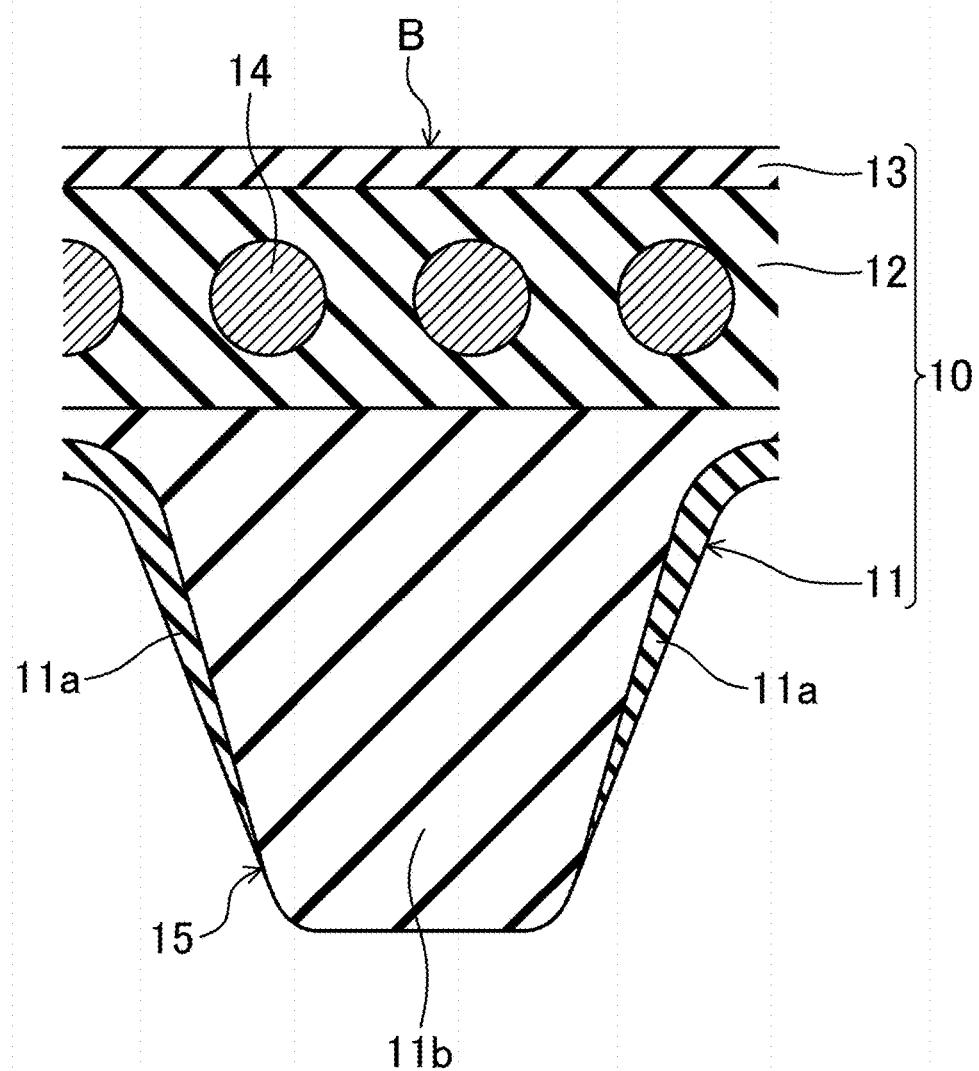
FIG. 15B illustrates a cross-sectional view of a single V-shaped rib of a V-ribbed belt according to a variation of the second embodiment.

In the first and second embodiments, the surface rubber layer 11a made of porous rubber has been described as a non-limiting example. However, as shown in FIGS. 15A and 15B, the surface rubber layer(s) 11a may be made of solid rubber.

In the first and second embodiments, the V-ribbed belt body 10 including the compressed rubber layer 11, the adhesive rubber layer 12, and the backface rubber layer 13 has been described as a non-limiting example. However, the V-ribbed belt body 10 may include the compressed rubber layer 11 and the adhesive rubber layer 12, and the backface rubber layer 13 may be replaced with a reinforcing fabric made of a fabric material, such as woven, knitted, or nonwoven fabric, comprised of yarn of cotton, polyamide fibers, polyester fibers, aramid fibers, or any other appropriate fibers, for example.

In the first and second embodiments, the V-shaped ribs 15 provided only on the compressed rubber layer 11 have been described as a non-limiting example. However, the V-ribbed belt may be a double-sided V-ribbed belt including a backface rubber layer also provided with V-shaped ribs.

In the first and second embodiments, the accessory drive belt transmission system 30 for an automobile has been described as a non-limiting example of a belt transmission system. However, the accessory drive belt transmission system may be a belt transmission system for general industrial applications and other applications.

EXAMPLES (Uncrosslinked Rubber Composition)

Uncrosslinked rubber compositions of the following rubbers 1 to 4 were prepared.

The composition of each rubber will also be shown in Table 1.

<Rubber 1>

An EPDM-1 (made by JSR Corporation, trade name: EP51, ethylene content: 67% by mass, ENB content: 5.8% by mass, Mooney viscosity: 23 $ML_{1+4}$ (125° C.)) was placed as a rubber component into a chamber of an internal Banbury mixer and masticated therein. Next, 35 parts by mass of an HAF carbon black (made by Tokai Carbon Co., Ltd., trade name: SEAST 3) serving as a reinforcing material, 15 parts by mass of a GPF carbon black (made by Tokai Carbon Co., Ltd., trade name: SEAST V) serving as a reinforcing material, 8 parts by mass of oil (made by Sun Oil Company, trade name: SUNPAR 2280) serving as a softener, 1 part by mass of an stearic acid (made by Kao Corporation, trade name: LUNAC) serving as a processing aid, 5 parts by mass of zinc oxide (made by Sakai Chemical Industry Co., Ltd., trade name: Zinc White No. 3) serving as a vulcanization aid, 1.7 parts by mass of sulfur (made by Nippon Kanryu Industry Co., Ltd., trade name: SEIMI OT) serving as a crosslinker, 2.8 parts by mass of a mixed vulcanization accelerator for EPDM (made by Sanshin Chemical Industry Co., Ltd., trade name: Sunceller EM-2), 1.2 parts by mass of a sulfenamide vulcanization accelerator (made by OUCHI SHINKO CHEMICAL INDUSTRIAL CO., LTD., trade name: NOCCELER MSA-G), 5 parts by mass of a high-styrene resin (made by JSR Corporation, grade: JSR0061) serving as a resin for rubber blending, 10 parts by mass of a phenol resin (made by Sumitomo Bakelite Co., Ltd., trade name: PR-12687) serving as another resin for rubber blending, 30 parts by mass of an ultrahigh molecular polyethylene resin (made by Mitsui Chemicals, Inc., trade name: HI-ZEX MILLION 240S) serving as still another resin for rubber blending, and 4.5 parts by mass of hollow particles (made by Sekisui Chemical Co., Ltd., trade name: ADVANCELL EMS-026) were mixed together relative to 100 parts by mass of the resultant rubber component. The resultant blend was kneaded with the mixer to produce an uncrosslinked rubber composition as rubber 1.

<Rubber 2>

An uncrosslinked rubber composition as rubber 2 was produced by the same method as that of the rubber 1 except that no hollow particles were blended into the base material rubber.

<Rubber 3>

An EPDM-2 (made by JSR Corporation, trade name: EP123, ethylene content: 58% by mass, ENB content: 4.5% by mass, Mooney viscosity: 19.5 $ML_{1+4}$ (125° C.)) was placed as a rubber component into a chamber of an internal Banbury mixer and masticated therein. Next, 70 parts by mass of an FEF carbon black (made by Tokai Carbon Co., Ltd., trade name: SEAST SO) serving as a reinforcing material, 8 parts by mass of oil serving as a softener, 1 part by mass of an stearic acid serving as a processing aid, 5 parts by mass of zinc oxide serving as a vulcanization aid, 1.7 parts by mass of sulfur serving as a crosslinker, 2.8 parts by mass of a mixed vulcanization accelerator for EPDM, 1.2 parts by mass of a sulfenamide vulcanization accelerator, and 5 parts by mass of a phenol resin serving as a resin for rubber blending were mixed together relative to 100 parts by mass of the resultant rubber component. The resultant blend was kneaded with the mixer to produce an uncrosslinked rubber composition as rubber 3.

<Rubber 4>

An EPDM-2 was placed as a rubber component into a chamber of an internal Banbury mixer and masticated therein. Next, 50 parts by mass of an HAF carbon black serving as a reinforcing material, 14 parts by mass of oil serving as a softener, 1 part by mass of an stearic acid serving as a processing aid, 5 parts by mass of zinc oxide serving as a vulcanization aid, 1.7 parts by mass of sulfur serving as a crosslinker, 2.8 parts by mass of a mixed vulcanization accelerator for EPDM, 1.2 parts by mass of a sulfenamide vulcanization accelerator, 10 parts by mass of an ultrahigh molecular polyethylene resin, 30 parts by mass of bentonite (made by Hojun Co., Ltd., trade name: Bengel HVP) serving as sheet silicate, and 25.5 parts by mass of nylon short fibers (made by Asahi Kasei Corporation, trade name: Leona 66, fiber length: 1 mm) were mixed together relative to 100 parts by mass of the resultant rubber component. The resultant blend was kneaded with the mixer to produce an uncrosslinked rubber composition as rubber 4.

TABLE 1

|  |  | Rubber 1 | Rubber 2 | Rubber 3 | Rubber 4 |
|---|---|---|---|---|---|
| Rubber Component | EPDM-1 | 100 | 100 |  |  |
|  | EPDM-2 |  |  | 100 | 100 |
| Reinforcing Material | HAF Carbon Black | 35 | 35 |  | 50 |
|  | GPF Carbon Black | 15 | 15 |  |  |
|  | FEF Carbon Black |  |  | 70 |  |
| Softener | Oil | 8 | 8 | 8 | 14 |
| Processing Aid | Stearic Acid | 1 | 1 | 1 | 1 |
| Vulcanization Aid | Zinc Oxide | 5 | 5 | 5 | 5 |
| Crosslinker | Sulfur | 1.7 | 1.7 | 1.7 | 1.7 |

TABLE 1-continued

| | | Rubber 1 | Rubber 2 | Rubber 3 | Rubber 4 |
|---|---|---|---|---|---|
| Vulcanization Accelerator | Mixed Vulcanization Accelerator for EPDM | 2.8 | 2.8 | 2.8 | 2.8 |
| | Sulfenamide Vulcanization Accelerator | 1.2 | 1.2 | 1.2 | 1.2 |
| Resin for Rubber Blending | High-styrene Resin | 5 | 5 | | |
| | Phenol Resin | 10 | 10 | 5 | |
| | Ultrahigh Molecular Polyethylene Resin | 30 | 30 | | 10 |
| Hollow Particles | — | | 4.5 | | |
| Sheet Silicate | Bentonite | | | | 30 |
| Short Fibers | Nylon Short Fibers | | | | 25.5 |
| Wear Resistance | Abrasion Loss (mm³) | 115.0 | 93.0 | 173.0 | 105.6 |
| Cold Resistance | Brittle Temperature (° C.) | −38 | −55 | −65 | −40 |

(V-ribbed Belt)

V-ribbed belts of the following first and second examples and the first to fifth comparative examples were produced. The composition of each belt will also be shown in Table 2.

First Example

A V-ribbed belt having a configuration similar to that of the first embodiment and including a surface rubber layer made of the rubber 1 and an inner rubber portion made of the rubber 3 was produced as the first example.

In the V-ribbed belt of the first example, the ratio (A1/A2) of the ethylene content (A1) of the EPDM-1 of the surface rubber layer to the ethylene content (A2) of the EPDM-2 of the inner rubber portion was 1.16. The ratio (B1/B2) of the ENB content (B1) of the EPDM-1 of the surface rubber layer to the ENB content (B2) of the EPDM-2 of the inner rubber portion was 1.29. The ratio (C1/C2) of the Mooney viscosity (C1) of the EPDM-1 of the surface rubber layer at 125° C. to the Mooney viscosity (C2) of the EPDM-2 of the inner rubber portion at 125° C. was 1.18. The abrasion loss of the rubber 1 forming the surface rubber layer was less than that of the rubber 3 forming the inner rubber portion. The difference between these abrasion losses was 58 mm³. The brittle temperature of the rubber 3 forming the inner rubber portion was lower than that of the rubber 1 forming the surface rubber layer. The difference between these brittle temperatures was 27° C.

Each of the adhesive rubber layer and the backface rubber layer was made of any other rubber composition containing an EPDM as a rubber component. A cord is made of twist yarn of polyethylene terephthalate fibers. The belt had a length of 1200 mm, a width of 10.68 mm, and a thickness of 4.3 mm, and included three ribs.

Second Example

A V-ribbed belt having the same configuration as that of the first example, except for its surface rubber layer made of the rubber 2, was produced as the second example.

In the V-ribbed belt of the second example, the ratios A1/A2, B1/B2, and C1/C2 were equal to those of the first example, respectively. The abrasion loss of the rubber 2 forming the surface rubber layer was less than that of the rubber 3 forming the inner rubber portion. The difference between these abrasion losses was 80 mm³. The brittle temperature of the rubber 3 forming the inner rubber portion was lower than that of the rubber 1 forming the surface rubber layer. The difference between these brittle temperatures was 10° C.

First Comparative Example

A V-ribbed belt having the same configuration as that of the first example, except for its inner rubber portion made of the rubber 2, was produced as the first comparative example.

In the V-ribbed belt of the first comparative example, the ratios A1/A2, B1/B2, and C1/C2 are all equal to 1.

Second Comparative Example

A V-ribbed belt having the same configuration as that of the first example, except for its surface rubber layer made of the rubber 3, i.e., a V-ribbed belt having its compressed rubber layer made of the rubber 3 alone, was produced as the second comparative example.

In the V-ribbed belt of the second comparative example, the ratios A1/A2, B1/B2, and C1/C2 are all equal to 1.

Third Comparative Example

A V-ribbed belt having the same configuration as that of the second example, except for its inner rubber portion made of the rubber 2, i.e., a V-ribbed belt having its compressed rubber layer made of the single rubber 2, was produced as the third comparative example.

In the V-ribbed belt of the third comparative example, the ratios A1/A2, B1/B2, and C1/C2 are all equal to 1.

Fourth Comparative Example

A V-ribbed belt having the same configuration as that of the first example, except for its surface rubber layer and its inner rubber portion both made of the rubber 4, i.e., a V-ribbed belt having its compressed rubber layer made of the single rubber 4 containing nylon short fibers, was produced as the fourth comparative example.

In the V-ribbed belt of the fourth comparative example, the ratios A1/A2, B1/B2, and C1/C2 are all equal to 1.

Fifth Comparative Example

A V-ribbed belt having the same configuration as that of the first example, except for its surface rubber layer made of the rubber 3 and its inner rubber portion made of the rubber 2, was produced as the fifth comparative example.

In the V-ribbed belt of the fifth comparative example, the ratios A1/A2, B1/B2, and C1/C2 were 0.87, 0.78, and 0.85, respectively.

TABLE 2

| | | Examples | | Comparative Examples | | | | |
|---|---|---|---|---|---|---|---|---|
| | | 1 | 2 | 1 | 2 | 3 | 4 | 5 |
| Surface Rubber Layer | Rubber Type | Rubber 1 | Rubber 2 | Rubber 1 | Rubber 3 | Rubber 2 | Rubber 4 | Rubber 3 |
| | Ethylene Content (% by mass) A1 | 67 | 67 | 67 | 58 | 67 | 58 | 58 |

TABLE 2-continued

|  |  | Examples | | Comparative Examples | | | | |
|---|---|---|---|---|---|---|---|---|
|  |  | 1 | 2 | 1 | 2 | 3 | 4 | 5 |
|  | ENB Content (% by mass) B1 | 5.8 | 5.8 | 5.8 | 4.5 | 5.8 | 4.5 | 4.5 |
|  | Mooney Viscosity (ML$_{1+4}$ (125° C.)) C1 | 23 | 23 | 23 | 19.5 | 23 | 19.5 | 19.5 |
| Inner Rubber Portion | Rubber Type | Rubber 3 | Rubber 3 | Rubber 2 | Rubber 3 | Rubber 2 | Rubber 4 | Rubber 2 |
|  | Ethylene Content (% by mass) A2 | 58 | 58 | 67 | 58 | 67 | 58 | 67 |
|  | ENB Content (% by mass) B2 | 4.5 | 4.5 | 5.8 | 4.5 | 5.8 | 4.5 | 5.8 |
|  | Mooney Viscosity (ML$_{1+4}$ (125° C.)) C2 | 19.5 | 19.5 | 23 | 19.5 | 23 | 19.5 | 23 |
|  | A1/A2 | 1.16 | 1.16 | 1 | 1 | 1 | 1 | 0.87 |
|  | B1/B2 | 1.29 | 1.29 | 1 | 1 | 1 | 1 | 0.78 |
|  | C1/C2 | 1.18 | 1.18 | 1 | 1 | 1 | 1 | 0.85 |
| Wear Resistance | Wear Rate (%) | 1.7 | 1.2 | 1.7 | 3.1 | 1.2 | 1.8 | 2.2 |
| Cold Resistance | Running Cycle (Number of Cycles) | 160 | 165 | 60 | 152 | 118 | 95 | 80 |

(Test Method)

<Wear Resistance>

Based on JIS K6264-2, a test piece of each of the rubbers 1 to 4 was prepared, and a DIN abrasion test was conducted.

<Cold Resistance>

Based on JIS K6261, a test piece of each of the rubbers 1 to 4 was prepared, and its brittle temperature was measured.

<Belt Running Test>

—Wear Resistance Evaluation—

Figure 16A:
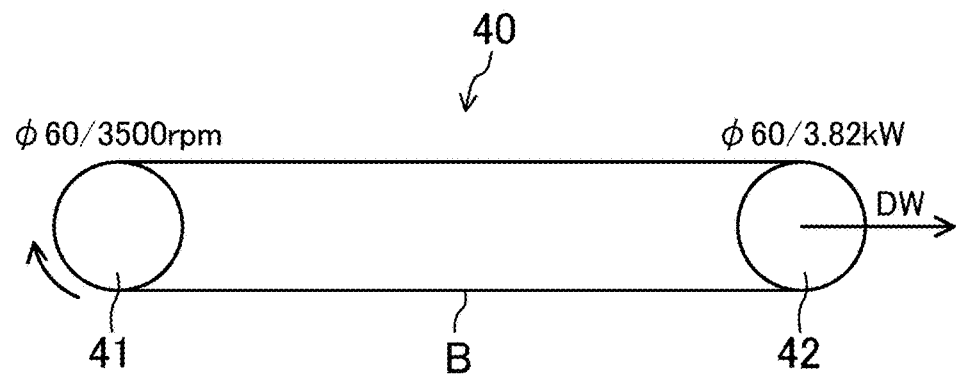
FIG. 16A illustrates a layout of pulleys of a belt running tester for evaluating wear resistance.

FIG. 16A illustrates a layout of pulleys of a belt running tester 40 for evaluating wear resistance.

The belt running tester 40 for evaluating wear resistance includes a drive pulley 41 and a driven pulley 42, which are ribbed pulleys having a diameter of 60 mm. These pulleys are spaced apart from each other in a lateral direction. The belt running tester 40 for evaluating wear resistance is configured such that a V-ribbed belt B is wrapped around the drive pulley 41 and the driven pulley 42 so that a surface of the V-ribbed belt including V-shaped ribs is in contact with these pulleys.

After the mass of each of the V-ribbed belts of the first and second examples and the first to fifth comparative examples was measured, the V-ribbed belt was placed on the belt running tester 40 for evaluating wear resistance. Rotation load of 3.82 kW was applied to the driven pulley 42, and a dead weight (DW) of 1177 N was laterally applied to the driven pulley 42 so that a tensile force is applied to the V-ribbed belt. Under an atmosphere of room temperature, the drive pulley 41 was rotated at 3,500 rpm, making the belt run for 24 hours. After that, the mass of the belt was measured again. A reduction of the mass of the belt measured after the belt running was divided by the mass before the belt running, thereby obtaining a percentage as a wear rate.

—Cold Resistance Evaluation—

Figure 16B:
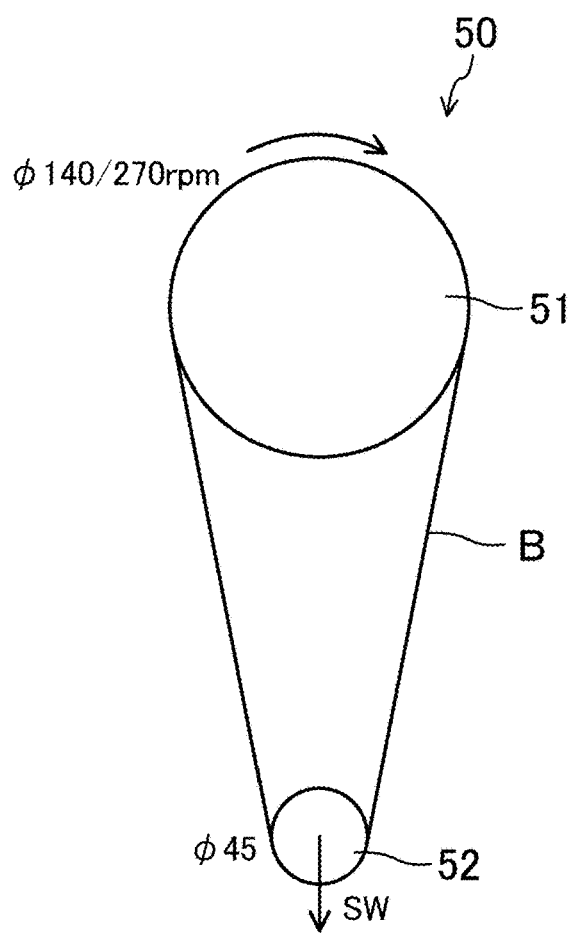
FIG. 16B illustrates a layout of pulleys of a belt running tester for evaluating cold resistance.

FIG. 16B illustrates a layout of pulleys of a belt running tester 50 for evaluating cold resistance.

The belt running tester 50 for evaluating cold resistance includes a drive pulley 51, which is a ribbed pulley having a diameter of 140 mm, and a driven pulley 52, which is a ribbed pulley having a diameter of 45 mm. These pulleys are spaced apart from each other in a vertical direction. The belt running tester 50 for evaluating cold resistance is configured such that a V-ribbed belt B is wrapped around the drive pulley 51 and the driven pulley 52 so that a surface of the V-ribbed belt including V-shaped ribs thereof is in contact with these pulleys.

The V-ribbed belts of the first and second examples and the first to fifth comparative examples were each placed on the belt running tester 50 for evaluating cold resistance. A set weight (SW) of 29.4 N was applied downward to the driven pulley 52 so that a tensile force is applied to the V-ribbed belt. Under an atmosphere of −40° C., the drive pulley 51 was rotated for 5 minutes at 270 rpm to make the belt run. After that, the drive pulley 51 was stopped for 25 minutes. Such a procedure was defined as one cycle. When the driven pulley 51 was at rest, whether or not a crack appeared on the surface of a V-shaped rib of the V-ribbed belt B was visually checked at fixed intervals. When any crack was found, the belt stopped running. The number of cycles that had elapsed until the belt stopped running was recorded.

(Test Results)

The test results are shown in Tables 1 and 2.

Table 1 shows that the rubbers 1 and 2 containing an EPDM having a relatively high ethylene content as a rubber component have a lower wear rate than the rubber 3 containing an EPDM having a relatively low ethylene content as a rubber component, and thus have high wear resistance. The rubber 4 contains an EPDM having a relatively low ethylene content as a rubber component, but has higher wear resistance than the rubber 1. The reason for this may be that the rubber 4 contains nylon short fibers.

Table 1 further shows that the rubber 3 containing an EPDM having a relatively low ethylene content as a rubber component has a lower brittle temperature than the rubbers 1 and 2 containing an EPDM having a relatively high ethylene content as a rubber component, and thus has high cold resistance. The rubber 4 contains an EPDM having a relatively low ethylene content as a rubber component, but has lower cold resistance than the rubber 2. The reason for this may be that the rubber 4 contains nylon short fibers.

Table 2 shows that the belts of the first and second examples in each of which the ethylene content of the EPDM serving as the rubber component of the surface rubber layer is higher than that of the EPDM serving as the rubber component of the inner rubber portion are superior in both wear resistance and cold resistance, whereas the belts of the first to fifth comparative examples in each of which the ethylene content of the EPDM serving as the rubber component of the surface rubber layer is the same as, or lower than, that of the EPDM serving as the rubber component of the inner rubber portion are superior only in one of these resistances.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A V-ribbed belt comprising:
a compressed rubber layer constituting an inner surface portion of the V-ribbed belt, the compressed rubber layer being provided with a plurality of V-shaped ribs extending in a belt longitudinal direction, the V-shaped ribs being arranged parallel to one another in a belt width direction, wherein
the compressed rubber layer includes a surface rubber layer including side surface portions of the V-shaped ribs, and an inner rubber portion provided inside the surface rubber layer,
the surface rubber layer and the inner rubber portion are each made of a rubber composition containing an ethylene-α-olefin elastomer as a main ingredient of a rubber component, and
an ethylene content of the ethylene-α-olefin elastomer contained in the rubber component of the rubber composition forming the surface rubber layer is higher than an ethylene content of the ethylene-α-olefin elastomer contained in the rubber component of the rubber composition forming the inner rubber portion.

2. The V-ribbed belt of claim 1, wherein
the surface rubber layer is made of porous rubber, and the inner rubber portion is made of solid rubber.

3. The V-ribbed belt of claim 1, wherein
an abrasion loss of the rubber composition forming the surface rubber layer is less than an abrasion loss of the rubber composition forming the inner rubber portion, the abrasion losses being measured by a DIN abrasion test based on JIS K6264-2.

4. The V-ribbed belt of claim 3, wherein
a difference between the abrasion loss of the rubber composition forming the surface rubber layer and the abrasion loss of the rubber composition forming the inner rubber portion is greater than or equal to 15.0 $mm^3$.

5. The V-ribbed belt of claim 1, wherein
a brittle temperature of the rubber composition forming the inner rubber portion is lower than a brittle temperature of the rubber composition forming the surface rubber layer, the brittle temperatures being measured based on JIS K6261.

6. The V-ribbed belt of claim 5, wherein
a difference between the brittle temperature of the rubber composition forming the inner rubber portion and the brittle temperature of the rubber composition forming the surface rubber layer is greater than or equal to 5.0° C.

7. The V-ribbed belt of claim 1, wherein
the ethylene-α-olefin elastomer contained in the rubber component of the rubber composition forming the surface rubber layer has an ethylene content from 59% by mass to 85% by mass.

8. The V-ribbed belt of claim 1, wherein
the ethylene-α-olefin elastomer contained in the rubber component of the rubber composition forming the inner rubber portion has an ethylene content from 45% by mass to 66% by mass.

9. The V-ribbed belt of claim 1, wherein
a ratio of the ethylene content of the ethylene-α-olefin elastomer contained in the rubber component of the rubber composition forming the surface rubber layer to the ethylene content of the ethylene-α-olefin elastomer contained in the rubber component of the rubber composition forming the inner rubber portion is 1.05 or more and 1.90 or less.

10. The V-ribbed belt of claim 1, wherein
the ethylene-α-olefin elastomer contained, as the main ingredient of the rubber component, in each of the rubber composition forming the surface rubber layer and the rubber composition forming the inner rubber portion is an ethylene-propylene-diene terpolymer.

11. The V-ribbed belt of claim 10, wherein
the ethylene-propylene-diene terpolymer contains ethylidene norbornene as a diene component.

12. The V-ribbed belt of claim 11, wherein
the ethylene-propylene-diene terpolymer contained in the rubber component of the rubber composition forming the surface rubber layer has an ethylidene norbornene content from 0.50% by mass to 14% by mass.

13. The V-ribbed belt of claim 11, wherein
the ethylene-propylene-diene terpolymer contained in the rubber component of the rubber composition forming the inner rubber portion has an ethylidene norbornene content from 0.50% by mass to 14% by mass.

14. The V-ribbed belt of claim 11, wherein
an ethylidene norbornene content of the ethylene-propylene-diene terpolymer contained in the rubber component of the rubber composition forming the surface rubber layer is higher than an ethylidene norbornene content of the ethylene-propylene-diene terpolymer contained in the rubber component of the rubber composition forming the inner rubber portion.

15. The V-ribbed belt of claim 14, wherein
a ratio of the ethylidene norbornene content of the ethylene-propylene-diene terpolymer contained in the rubber component of the rubber composition forming the surface rubber layer to the ethylidene norbornene content of the ethylene-propylene-diene terpolymer contained in the rubber component of the rubber composition forming the inner rubber portion is 1.10 or more and 1.40 or less.

* * * * *